US006988365B2

(12) United States Patent
Sasaki (10) Patent No.: US 6,988,365 B2
(45) Date of Patent: Jan. 24, 2006

(54) DUAL LOOP EXHAUST GAS RECIRCULATION SYSTEM FOR DIESEL ENGINES AND METHOD OF OPERATION

(75) Inventor: Shizuo Sasaki, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 10/929,667

(22) Filed: Aug. 30, 2004

(65) Prior Publication Data

US 2005/0103014 A1 May 19, 2005

Related U.S. Application Data

(60) Provisional application No. 60/523,386, filed on Nov. 19, 2003.

(51) Int. Cl.
*F02M 25/07* (2006.01)
*F01N 3/02* (2006.01)

(52) U.S. Cl. .................. 60/605.2; 123/568.21
(58) Field of Classification Search .............. 60/605.2; 123/568.21; F02M 25/07; F01N 3/02
See application file for complete search history.

(56) References Cited

U.S. PATENT DOCUMENTS

| 6,305,167 B1 | 10/2001 | Weisman, II ............ 60/605.2 |
| 6,354,084 B1 | 3/2002 | McKinley ............... 60/605.2 |
| 6,422,219 B1 | 7/2002 | Savonen ................ 60/605.2 |
| 6,457,461 B1 | 10/2002 | Romzek ................. 60/605.2 |
| 6,763,799 B2* | 7/2004 | Ito et al. ............ 123/568.21 |
| 2002/0173899 A1 | 11/2002 | Miller ................ 123/568.12 |
| 2004/0050375 A1* | 3/2004 | Arnold ................. 60/605.2 |
| 2004/0074480 A1* | 4/2004 | Chen et al. ............ 60/605.2 |
| 2004/0093866 A1* | 5/2004 | Ishikawa ............... 60/605.2 |
| 2005/0000497 A1* | 1/2005 | Nakai et al. ........... 60/605.2 |

FOREIGN PATENT DOCUMENTS

| JP | 05187329 A | * | 7/1993 |
| JP | 11210449 A | * | 8/1999 |
| JP | 11229973 A | * | 8/1999 |
| JP | 2002188524 A | * | 7/2002 |
| JP | 2002276405 A | * | 9/2002 |
| JP | 2002285879 A | * | 10/2002 |
| WO | WO 2004044412 A1 | * | 5/2004 |

* cited by examiner

*Primary Examiner*—Thai-Ba Trieu
(74) *Attorney, Agent, or Firm*—Gunn & Lee, P.C.; Ted D. Lee (57) ABSTRACT

A catalyst bed temperature of an aftertreatment device is maintained and the operational regime for stable and smokeless rich combustion is expanded by use of a dual loop exhaust gas recirculation system. Under light load conditions, at least a portion of the exhaust gas is recirculated through a relatively high pressure exhaust gas recirculation loop, wherein there is no substantial reduction in recirculated exhaust gas temperature or pressure. When operating in relatively medium or higher load operating regimes of the engine, at least a portion of the exhaust gas is passed through a relatively low pressure recirculation mode in which work is extracted from the recirculated gas by the turbine stage of a turbocharger and an exhaust gas recirculation cooler prior to reintroduction into the intake manifold of the engine.

15 Claims, 4 Drawing Sheets

DUAL LOOP EXHAUST GAS RECIRCULATION SYSTEM FOR DIESEL ENGINES AND METHOD OF OPERATION

This application claims the benefit of Provisional Application No. 60/523,386, Nov. 19, 2003.

BACKGROUND OF THE INVENTION

1. Technical Field

This invention relates generally to exhaust gas recirculation systems and methods of operation and more particularly to such systems and methods applicable to Diesel engines.

2. Background Art

Diesel engines play an important role in power generation and transportation economies. However, NOx and soot emissions from both stationary and mobile Diesel engines are a major contributor to air pollution. In order to meet future NOx emissions requirements, heavy-duty Diesel engines are looking to utilize exhaust gas recirculation (EGR) technology as a means of lowering NOx emissions. This technique directs some of the exhaust gases back into the intake of the engine. These gases have already been used by the engine and no longer contain a great amount of excess oxygen. By mixing the exhaust gases with fresh air, the amount of oxygen entering the engine is reduced. Since there is less oxygen to react with, few nitrogen oxides are formed. This greatly reduces the amount of nitrogen oxides that a vehicle releases into the atmosphere. Oxides of nitrogen are formed in the combustion chamber when the combustion temperature exceeds at 2500° F., or hotter, and nitrogen and oxygen in the combustion chamber more readily combine to form nitrous oxides. Controlled exhaust gas recirculation is able to lower the combustion temperature, often below the point at which nitrogen combines with oxygen to form NOx. However, if the combustion temperature is too low, combustion becomes unstable, resulting in the formation of soot, i.e., particulate matter (PM), an undesirable emission.

Therefore, combustion temperature control of the exhaust gas recirculation equipped Diesel engines, although not fully addressed in prior EGR systems, is extremely important. Heretofore, EGR systems have primarily been directed to exhaust gas regulation rate control. For example, U.S. Pat. No. 6,305,167 granted Oct. 23, 2001 to Weisman, II et al. for a METHOD OF CONTROLLING AN ENGINE WITH AN EGR SYSTEM varies the exhaust gas recirculation rate by controlling the exhaust gas flow rate through a variable geometry turbocharger. However, the Weisman, et al. system cannot control combustion temperatures independently of exhaust gas recirculation flow rate.

The present invention is directed to overcoming the problems set forth above. It is desirable to have an exhaust gas recirculation system, and a method for operating the system, that enables the control of combustion temperatures under high load operation to reduce NOx formation, and maintain a sufficiently high combustion temperature during light load operation to prevent combustion instability and soot formation. Also, it is desirable to have such a system and method of operation that maintains the bed temperature of a catalytic exhaust gas aftertreatment device at a temperature sufficient to promote the efficient conversion of undesirable exhaust products.

SUMMARY OF THE INVENTION

In accordance with one aspect of the present invention, a dual loop exhaust gas recirculation system for a Diesel engine having at least one combustion chamber, an intake manifold and an exhaust manifold in respective fluid communication with the combustion chamber, and a turbocharger having a turbine stage and a compressor stage, includes a high pressure exhaust gas recirculation loop and a low pressure exhaust gas recirculation loop. The high pressure exhaust gas recirculation loop has an oxidation catalyst interposed between the exhaust manifold of the engine and an exhaust gas recirculation control valve positioned between the oxidation catalyst and the intake manifold of the engine. The low pressure exhaust gas recirculation loop has an exhaust gas aftertreatment device with an intake port in direct fluid communication with a discharge port of the turbine section of the turbocharger, and a discharge port in fluid communication with an exhaust conduit providing fluid communication between the exhaust gas aftertreatment device and an ambient environment. The lower pressure exhaust gas recirculation loop further includes an exhaust gas recirculation cooler having an intake port in controlled fluid communication with the discharge port of the exhaust gas aftertreatment device, and an exhaust gas recirculation control valve interposed between a discharge port of the exhaust gas recirculation cooler and the inlet port of the compressor stage of the turbocharger.

Other features of the dual loop exhaust gas recirculation system for a Diesel engine, in accordance with the present invention, includes an ambient air intake system that has an air flow meter in fluid communication with a source of ambient air and an airflow throttle valve interposed between the airflow meter and an inlet port of the compressor stage of the turbocharger.

Another feature of the dual loop exhaust gas recirculation system for a Diesel engine, in accordance with the present invention, includes an intercooler interposed between the discharge port of the compressor stage of the turbocharger and the intake manifold of the engine. Desirably, the intercooler is adapted to selectively bypass at least a portion of fluid discharged from the discharge port of the compressor stage around a heat transfer portion of the intercooler and into the intake manifold of the engine without significantly altering the temperature of the bypassed fluid.

In another aspect of the present invention, a method for operating a Diesel engine in two exhaust gas recirculation modes, in which the Diesel engine has at least one combustion chamber, an intake manifold and an exhaust manifold in respective fluid communication with the combustion chamber, and a turbocharger having a turbine stage and a compressor stage, and an exhaust gas aftertreatment device in fluid communication with a discharge port of the turbine stage of the turbocharger, includes defining a low load portion of an operating regime of the engine in which a first exhaust recirculation mode is desired. Another portion of the operating regime of the engine is defined in which a second exhaust gas recirculation mode is desired. At least one contemporaneous engine operating parameter is sensed and a desirable one of the first or second defined exhaust gas recirculation modes is determined in response to a sensed value of the contemporary engine operating parameter. Exhaust gas is discharged from the combustion chamber into the exhaust manifold of the engine. In response to determining that the first defined exhaust gas recirculation mode is the desired exhaust gas recirculation mode, the exhaust gas is divided into first and second portions. The first portion of the exhaust gas is directed through an oxidation catalyst and an exhaust gas recirculation control valve and discharged into the intake manifold of the engine wherein the first portion of exhaust gas is mixed with air. The mixed first portion of the exhaust gas and air is subsequently inducted into at least one combustion chamber of the engine. The second portion of the exhaust gas is directed through the turbine stage of the turbocharger and the exhaust gas aftertreatment device and subsequently into an ambient environment.

In response to determining that the second defined exhaust gas recirculation mode is the desired exhaust gas recirculation mode, all of the exhaust gas is directed from the exhaust manifold through the turbine stage of the turbocharger and into the exhaust gas aftertreatment device. The exhaust gas is discharged from the exhaust gas aftertreatment device and controllably divided into principal and subordinate portions. The principal portion of the exhaust gas is directed through an exhaust gas recirculation cooler and an intake conduit in fluid communication with the intake port of the compressor stage of the turbocharger. The principal portion of the exhaust gas is controllably mixed with air and directed into the intake port of the compressor stage of the turbocharger. The mixed principal portion of the exhaust gas and air is compressed, and the compressed mixture is discharged from the discharge port of the compressor stage of the turbocharger and into the intake manifold of the engine. The compressed mixture of the principal portion of the exhaust gas and air is then inducted into the combustion chamber of the engine. The subordinate portion of the exhaust gas is discharged into the ambient atmosphere.

Other features of the method for operating a Diesel engine in two exhaust gas recirculation modes include the sensing of at least one contemporaneous engine operator parameter being sensing engine speed, crank angle, engine load, intake manifold temperature, engine coolant temperature, exhaust gas temperature, exhaust gas aftertreatment device temperature, fuel injection volume, accelerator angle, and/or cylinder pressure.

Another feature of the method for operating a Diesel engine in two exhaust gas recirculation modes, in accordance with the present invention, includes controllably regulating the amount of ambient air provided to the inlet port of the compressor stage.

Yet another feature of the method for operating a Diesel engine in two exhaust gas recirculation modes, in accordance with the present invention, includes directing the compressed mixture of the principal portion of the exhaust gas and air through an intercooler after discharging the compressed mixture from the compressor stage of the turbocharger, and prior to discharging the compressed mixture into the intake manifold of the engine.

BRIEF DESCRIPTION OF THE DRAWINGS

A more complete understanding of the dual loop exhaust gas recirculation system for a Diesel engine and a method for operating such a system may be had by reference to the following detailed description when taken in conjunction with the accompanying drawings, wherein.

DETAILED DESCRIPTION OF THE INVENTION

Figure 1:
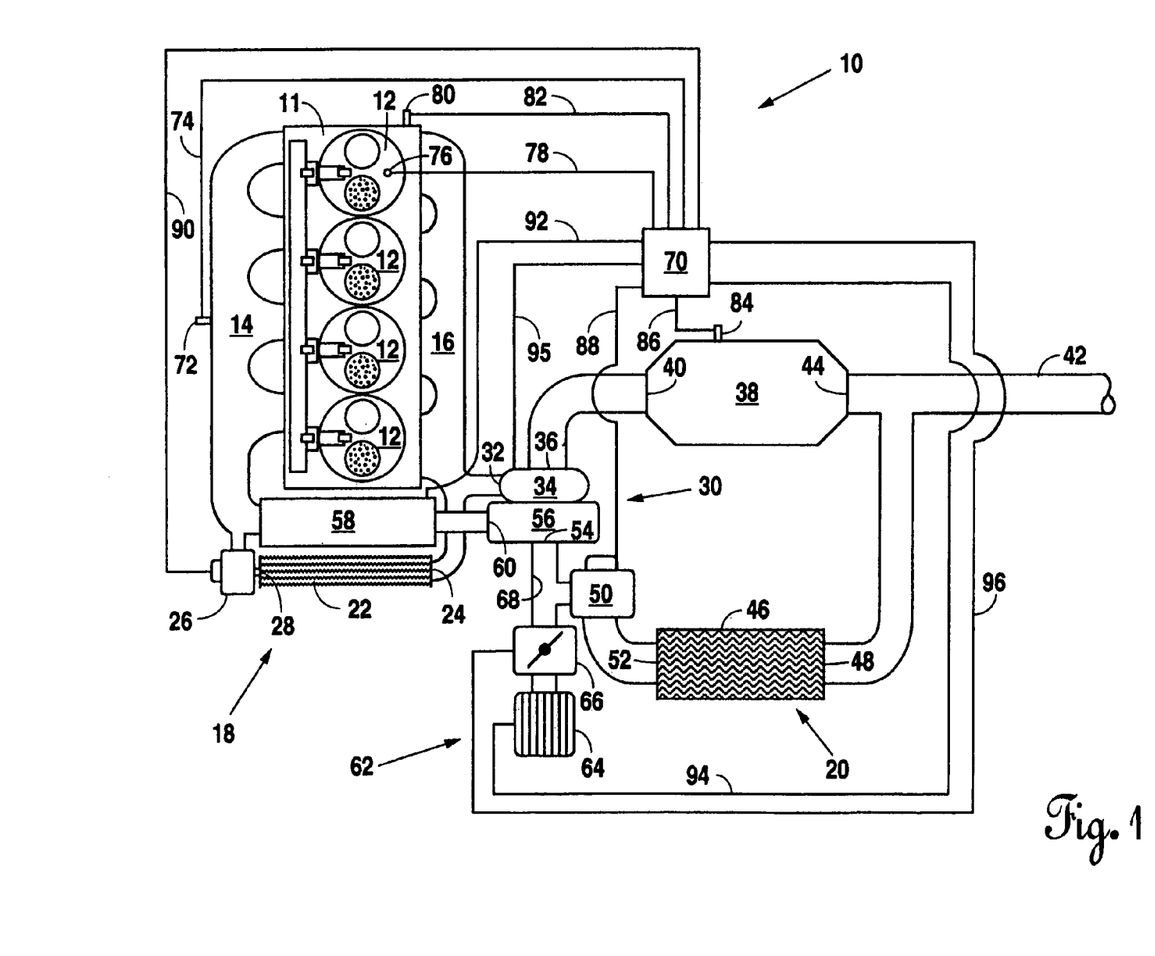
FIG. 1 is a schematic diagram of dual loop exhaust gas recirculation system according to the present invention.

A dual loop exhaust gas recirculation system for a Diesel engine is generally indicated with reference numeral 10 in FIG. 1. The Diesel engine has at least one, and in the illustrated example four, combustion chambers 12, an intake manifold 14, and an exhaust manifold 16, both in respective communication with combustion chambers 12. The dual loop exhaust gas recirculation 10, in accordance with the present invention, has a high pressure exhaust gas recirculation loop 18 and a low pressure exhaust gas recirculation loop 20. The high pressure exhaust gas recirculation loop 18 has an oxidation catalyst 22 with an intake port 24 is in controlled fluid communication with the exhaust manifold 16 of the engine. The oxidation catalyst 22 reduces carbon monoxide (CO) and unburned hydrocarbons (HC) thereby reduces the unburned hydrocarbons, and in the process, consumes oxygen ($O_2$). Reducing the hydrocarbons carried in the exhaust gases discharged from the exhaust manifold 16 greatly reduces the deposition tendency of exhaust products on downstream control devices, such as an exhaust gas recirculation flow control valve 26 interposed between an exhaust port 28 and the intake manifold 14. Reduction of oxygen carried in the exhaust stream avoids combustion and torque fluctuation at rich combustion attributable to variations in the amount of available oxygen. Also, the oxidation catalyst 22 does not appreciably reduce the exhaust gas recirculation gas temperature.

The low pressure exhaust gas recirculation loop 20 has a turbocharger 30 with an intake port 32 of a turbine section of a turbocharger 30 in direct fluid communication with the exhaust manifold 16. Desirably, the turbocharger 30 is adapted to regulate and control the exhaust gas flow rate and air compression performance of a compressor section 56 of the turbocharger 30. For example, a variable nozzle turbine that has adjustable nozzle veins positioned inside the turbo housing to adjust the turbocharger speed and boost. Alternatively, a waste gate may be incorporated within the turbocharger 30 to bypass controlled amounts of exhaust gas around the turbine section 34 of the turbocharger 30.

An aftertreatment device 38 has an intake port 40 that is in direct communication with an exhaust port 36 of the turbine section 34 of the turbocharger 30. For purposes of carrying out the present invention, the aftertreatment device 38 may be one or more catalyst-based converters, such as an oxidation catalyst, a diesel particulate filter and/or a lean NOx trap. The specific type, number and position of the one or more aftertreatment devices will depend upon specific emission control requirements, which may vary with different engine characteristics and applications.

An exhaust conduit 42 provides fluid communication between an exhaust port 44 of the aftertreatment device 38 and an ambient environment. The low pressure exhaust gas recirculation loop 20 includes an exhaust gas recirculation cooler 46 positioned downstream of the exhaust port 44 of the aftertreatment 38. An intake port 48 of the exhaust gas recirculation cooler 46 may be in either direct fluid communication with the exhaust port 44 of the aftertreatment device 38, or in direct fluid communication with a portion of the exhaust conduit 42 adjacent the exhaust port 44 of the aftertreatment device 38. The relative amounts of exhaust gas exiting through the exhaust conduit 42 to the ambient atmosphere and the amount of exhaust gas directed to the exhaust gas recirculation cooler 46 for subsequent reuse, is controlled by an exhaust gas recirculation control valve 50 interposed a discharge port 52 and an intake port 54 of a compressor section 56 of the turbocharger 32. Desirably, an intercooler 58 is interposed between a discharge port 60 of the compressor section 56 and the intake manifold 14. The intercooler 58 has an internally disposed heat transfer portion that is able to cool the compressed air, or compressed mixture of air and exhaust gas discharged from the discharge port 60 of the compressor section 56 of the turbocharger 30. Typically, the method of cooling is by means of ambient air, water or engine coolant. Desirably, intercooler 58 has a controllably flow bypass portion which can direct the compressed air or mixture of compressed air and exhaust gas around the heat transfer portion of the intercooler 58. By this means, the temperature of the intake charge delivered to the combustion chamber 12 may be controlled if the intake charge temperature is high by passing at least a portion of the compressed air or air/exhaust gas mixture through the bypass portion of the intercooler 58, or maintained at the discharge temperature of the air or air/exhaust gas mixture from the compressor section 56 of the turbocharger 30 if the ambient air or recirculated exhaust gas temperature is low.

The dual loop exhaust gas recirculation system 10, embodying the present invention, also includes an intake air system 62 having an air flow meter 64 disposed upstream of the throttle valve 66. The throttle valve 66 is able to control the flow of ambient air to the intake port 54 of the compressor section 56 of the turbocharger 30. Preferably, an intake conduit 68 is disposed between the throttle valve 66 and the intake port 54 of the compressor section 56 and provides a mixing chamber for exhaust gas recirculated through the low pressure exhaust gas loop 20.

Desirably, the dual loop exhaust gas recirculation system 10 has a plurality of sensors adapted to sense respective engine operating parameters and provide data signals to a programmable electronic engine control unit (EECU) 70. In accordance with predetermined instructions, or a map, the EECU 70 provides control signals to controlled elements of the dual loop exhaust gas recirculation system 10. For example, in the illustrative embodiment, an intake manifold temperature sensor 72 provides a signal 74 to the EECU 70 that is representative of the temperature of the intake charge prior to induction into respective combustion chambers 12. A cylinder pressure sensor 76 provides a cylinder pressure signal to the EECU 70. Similarly, an engine coolant temperature sensor 80 provides a data signal 82 representative of the coolant temperature, and an exhaust gas temperature sensor disposed in thermal communication with the exhaust gas aftertreatment device 38 provides a temperature signal representative of the catalytic bed temperature of the exhaust gas aftertreatment device 38 to the EECU 70. In response to the sensed values of the aforementioned, or additional, data signals, the EECU 70, in accordance with the method described below in greater detail, provides a control signal 88 to the exhaust gas recirculation flow control valve 50 to control the flow rate of recirculated exhaust gas through the low pressure exhaust gas recirculation loop 20. Similarly, the EECU 70 provides a control signal 90 to the exhaust gas recirculation flow control valve 26 to control the flow rate of exhaust gas through the high pressure exhaust gas recirculation loop 18. The flow of compressed air or mixture of compressed air and exhaust gas through the intercooler 58 is controlled by a control signal 92.

In a similar manner, a data signal 94 is provided by the airflow meter 64 and may be used, typically in conjunction with other sensed parameters, to provide a control signal 96 to position the throttle valve 66 and, accordingly the amount of fresh air provided to the intake port 54 of the compressor section 56 of the turbocharger 30.

Figure 4:
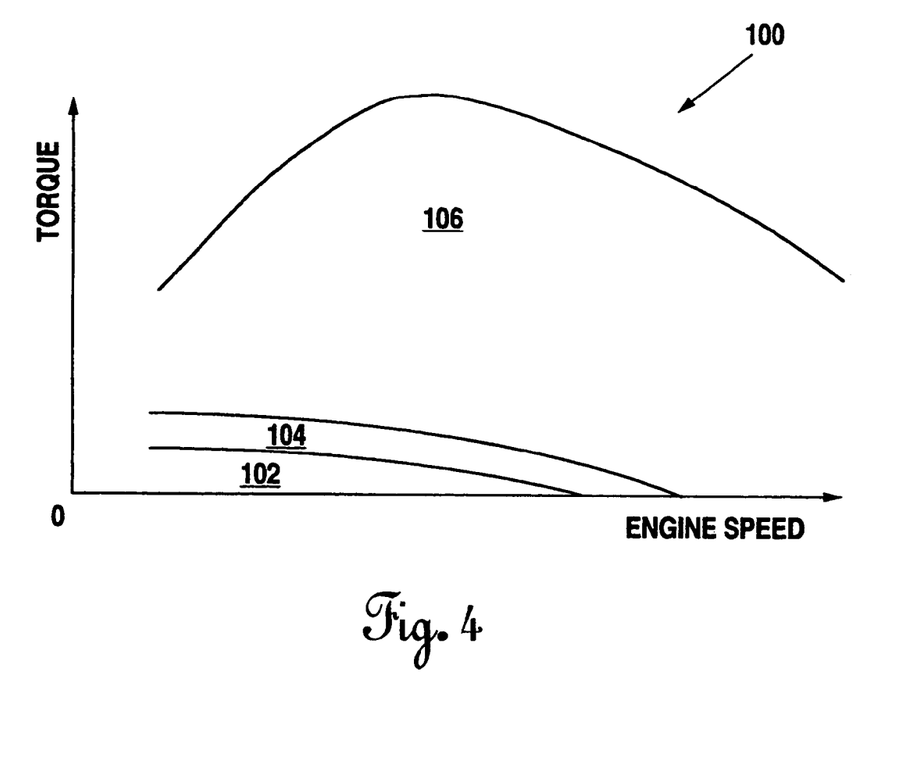
FIG. 4 is a graph showing representative respective operating envelopes for a Diesel engine adapted for selective operation in dual-loop exhaust gas recirculation modes.

Respective load envelopes of a typical Diesel engine operating regime is represented in FIG. 4. In the graphic representation, a low load operating area is represented by the area 100, and a medium to high low operating area is represented by the area 104. An area of the operating regime between the two defined load areas 100, 104 represents a transition area 102 in which the dividing line between the two defined load areas 100, 104 may be revised upwardly during transient operation of the engine from one load area to the other. The respective operating envelopes 100, 102, 104 may be established by lab testing of an engine, by modeling techniques, or other known engine mapping strategies.

After the respective desired operating load envelopes 100, 102, 104 are defined, the method for operating a Diesel engine in two exhaust gas recirculation modes includes sensing at least one contemporaneous engine operating parameter. For example, contemporaneous engine operating parameters suitable for use in controlling operation in respective exhaust gas recirculation modes, in accordance with the present invention, include such parameters as engine speed, crank angle, engine load, intake manifold temperature, engine coolant temperature, exhaust gas temperature, exhaust gas aftertreatment device temperature, fuel injection volume, accelerator angle and/or cylinder pressure.

A desirable one of the predefined exhaust gas recirculation modes represented by the load areas 100, 102, 104 of the engine map in response to the sensed value of the one or more contemporary engine operating parameters. For example, the dividing line between the high or low pressure loop operation may be determined as a function of engine speed and load, injection volume or accelerator angle or other representative values which decide the volume of injected fuel. By way of further example, when operating in a medium to high load area 102 of the engine operating regime, if coolant temperature drops below that of a steady state condition, the dividing line between the low load area 100 and the high load area 104 is moved upwardly, forming the defined transition area 102. In a similar manner, if manifold temperature is insufficient to provide stable combustion, or if the catalyst bed or tailpipe temperature is insufficient, the dividing line between the low load operating area 100 and the high load operating area 104 may be moved upwardly. By way of further example, the dividing line between the defined low and medium to high operating areas 100, 104 may be revised by the sensed value obtained from the cylinder pressure signal 78. By way of further illustration, if the maximum pressure (Pmax) drops between successive combustion cycles, the dividing line may be moved toward to the higher load area 104 of the map. If the change in pressure (dP) with respect to the change in maximum heat transfer rate (dqmax)—a value derived from the cylinder pressure signal 78—the dividing line is likewise moved from the low load area 100 to the high load area 104. Similarly, if the change in the heat transfer rate (dQ) with respect to the change in the maximum heat transfer rate (dqmax) is lower than a predetermined value, the dividing line is moved from the low upwardly toward the higher load portion of the map.

Figure 2:
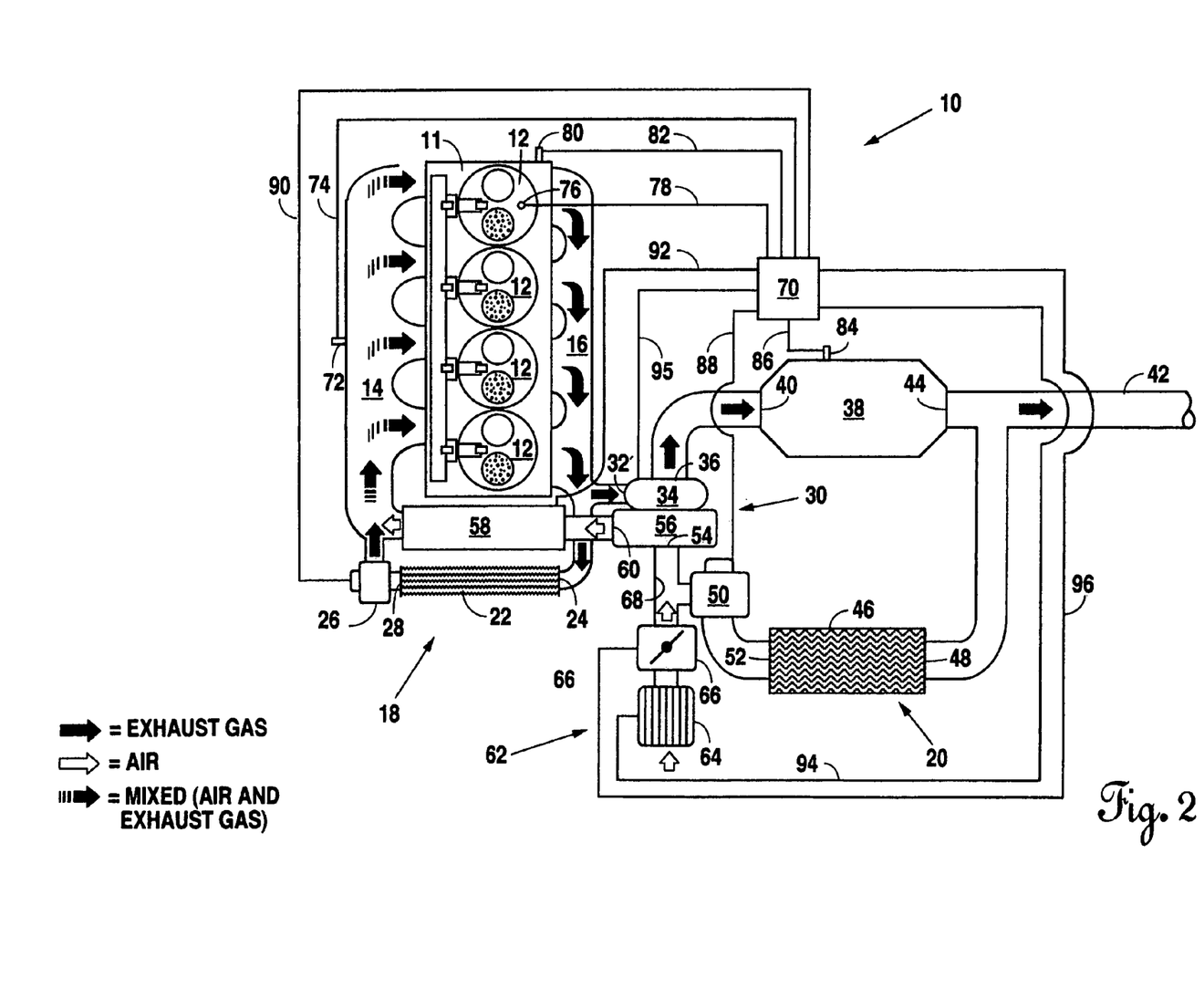
FIG. 2. is a schematic diagram showing the exhaust flow path through a high pressure exhaust gas recirculation loop according to the present invention.

In carrying out the method embodying the present invention, exhaust gas is discharged from the respective combustion chambers 12 into the exhaust manifold 16. If it is determined that the first defined exhaust gas recirculation mode is desired, a first portion of the exhaust gas is directed through the oxidation catalyst 22 disposed in the high pressure exhaust gas recirculation loop 18. The amount of exhaust gas comprising the first portion directed to the oxidation catalyst is controlled by the control signal 90 provided by the EECU 70 to the exhaust gas recirculation flow control valve 26. After the first portion passes through the oxidation catalyst 22 and the exhaust gas recirculation flow control valve 26, it is discharged into the intake manifold 14 and mixed with air prior to inducting the mixture of the first portion of exhaust gas and air into the combustion chambers 12 of the engine. When operating in the first defined exhaust gas recirculation mode, i.e., a relatively high pressure recirculation mode, a second portion of exhaust gas is directed to the turbine stage 34 of the turbocharger 30 through the exhaust gas after-treatment device 38, and subsequently into the ambient environment. The defined first exhaust gas recirculation mode directs the recirculated exhaust gas through the relatively high pressure loop 18, wherein there is no appreciable reduction in temperature or pressure of the exhaust gas prior to reintroduction into the intake manifold 14.

Figure 3:
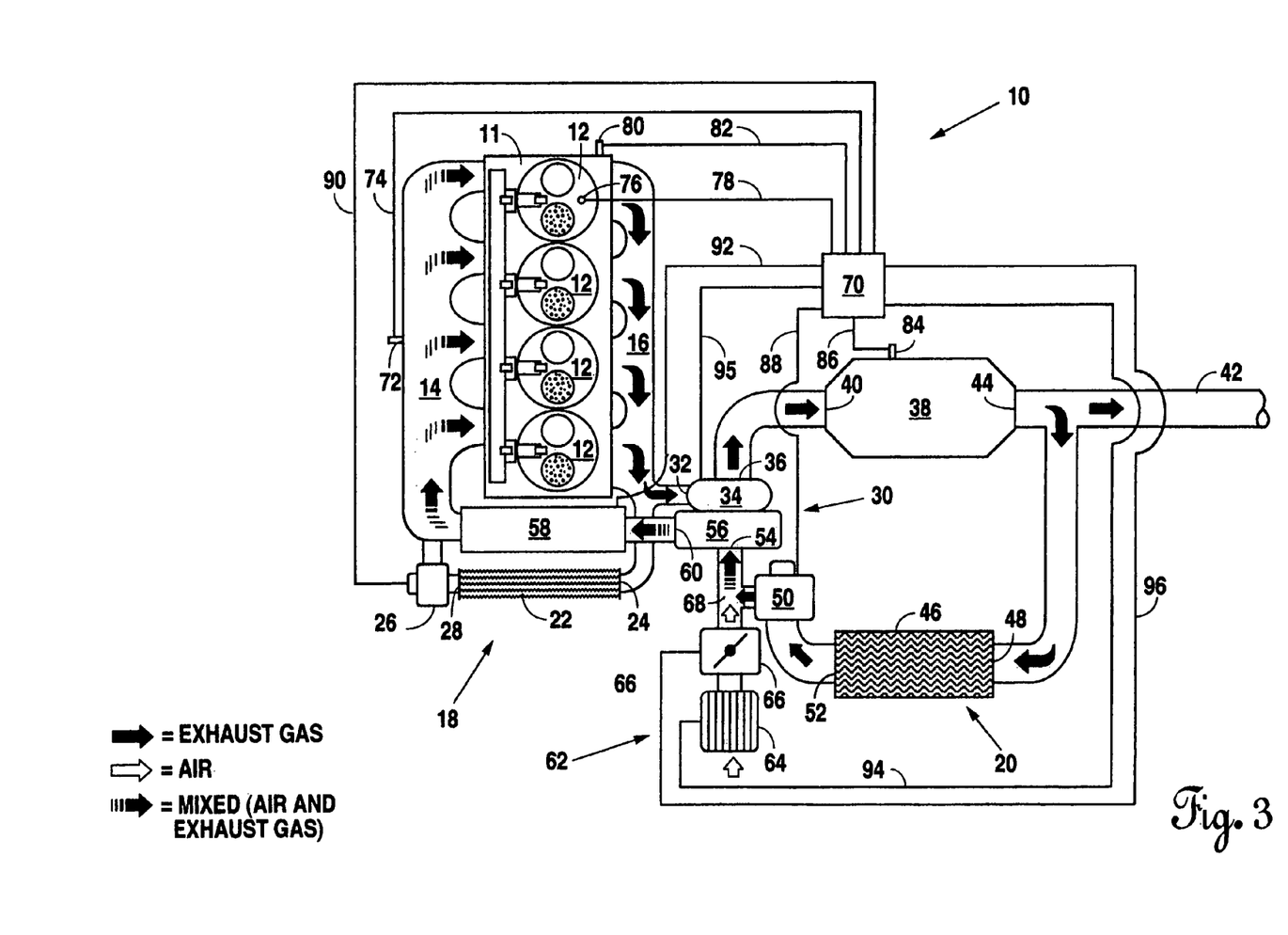
FIG. 3 is a schematic diagram showing the exhaust flow path through a low pressure exhaust gas recirculation loop according to the present invention.

In response to determining that the second defined exhaust gas recirculation mode is desired, all of the exhaust gas is directed from the exhaust manifold 16 through the turbine stage 34 of the turbocharger 30. After passing through the turbine stage 34 of the turbocharger 30, wherein work, represented by a loss of temperature and pressure, is extracted from the exhaust stream and the discharged exhaust gas is directed into the exhaust gas recirculation device 38. Upon discharge from the exhaust gas aftertreatment device 38, the exhaust gas is controllably divided into principal and subordinate portions. For purposes of the ensuing discussion, the principal portion of the divided exhaust gas defines the portion of exhaust gas subsequently recirculated to the intake manifold 14 of the engine whereas the subordinate portion of the divided exhaust gas defines that portion of the exhaust gas discharged into the ambient atmosphere regardless of respective actual amounts of exhaust gas constituting each portion. The principal portion of the exhaust gas is directed through the exhaust gas recirculation cooler 46 and through the exhaust gas recirculation flow control valve 50 which regulates the flow rate of the principal portion of the exhaust gas through the relatively low pressure exhaust gas recirculation loop 20. Exhaust gas pressure within the low pressure exhaust gas recirculation loop 20 is lower than the exhaust gas recirculated through the high pressure exhaust gas recirculation loop 18 because work is extracted from the exhaust gas from which the principal portion is divided upon passage through the turbine section 34 of the turbocharger 30. After discharge from the exhaust gas recirculation flow control valve 50, the principal portion of the exhaust gas is mixed with air and the mixed principal portion of the exhaust gas and air is directed into the intake port 54 of the compressor stage 56 of the turbocharger 30. After compression, the mixed principal portion of the exhaust gas and air is discharged through the discharge port 60 of the compressor stage 56 and subsequently into the intake manifold 14 of the engine.

In a preferred embodiment of the present invention, after the compressed mixture of the principal portion of the exhaust gas and air is discharged from the discharge port 60 of the compressor stage 56, at least a portion of the compressed mixture is controllably directed through the intercooler 58 prior to discharge into the intake manifold 14 of the engine.

[Refer to FIGS. 2 and 3 in above discussion of low and high pressure loops.]

From the foregoing, it can be seen that the present invention provides combustion control as a result of controlling both intake air from the ambient atmosphere and recirculated exhaust gas temperature, flow rate, and composition. By controlling temperature, rate and composition, a stable and smokeless rich combustion operating area is increased to include both lower and higher load operating regimes of the engine. Also, the temperature and flow rate of exhaust gas is controlled to maintain sufficient catalyst bed temperature for efficient catalytic conversion of undesirable emissions. Temperature control of exhaust gas passing through the exhaust gas aftertreatment device is enabled by a reduction in low temperature gas amount passing through the catalytic converter under light loads, thereby diminishing the cooling effects of lower temperature gas during light load operation, and increases the high temperature gas amount at high loads. Consequently, the present invention provides an increased operational area for smokeless rich combustion at high catalyst bed temperature under steady state as well as transient operating conditions.

Although the present invention is described in terms of a preferred illustrative embodiment, those skilled in the art will recognize that the dual loop exhaust gas recirculation system and the method of operating such a system may be carried out with modifications or alteration of the described sensors and control elements. Such modifications and alterations are intended to fall within the scope of the following claims. Other aspects, features, and advantages of the present invention may be obtained from a study of this disclosure and the drawings, along with the appended claims.

What I claim is:

1. A method for operating a Diesel engine in two exhaust gas recirculation modes, said Diesel engine having at least one combustion chamber, an intake manifold and an exhaust manifold in respective fluid communication with the combustion chamber, and a turbocharger having a turbine stage and a compressor stage, said turbine stage having an inlet port in fluid communication with said exhaust manifold and a discharge port in fluid communication with an exhaust gas aftertreatment device, and said compressor stage having an inlet port in fluid communication with a source of ambient air and a discharge port in fluid communication with said intake manifold, said method comprising:

defining a low load portion of an operating regime of the engine in which a first exhaust gas recirculation mode is desired;

defining a medium to high load portion of the operating regime of the engine in which a second exhaust gas recirculation mode is desired;

sensing at least one contemporaneous engine operating parameter;

determining a desirable one of said first and second defined exhaust gas recirculation modes in response to a sensed value of said at least one contemporary engine operating parameter;

discharging exhaust gas from said at least one combustion chamber into said exhaust manifold;

controllably dividing the exhaust gas into first and second portions in response to determining that said first defined exhaust gas recirculation mode is the desired exhaust gas recirculation mode;

directing the first portion of the exhaust gas through an oxidation catalyst wherein the temperature of said first portion of the exhaust gas is maintained at a temperature sufficient to subsequently provide a mixture of the first portion of the exhaust gas and air in said intake manifold that has a temperature that enables stable combustion in response to determining that said engine is operating in said defined low load portion of the engine operating regime;

subsequently directing the first portion of the exhaust gas to an exhaust gas recirculation flow control valve;

discharging the first portion of the exhaust gas from the exhaust gas recirculation flow control valve and into said intake manifold;

mixing the first portion of the exhaust gas with air in said intake manifold;

inducting the mixed first portion of the exhaust gas and air into said at least one combustion chamber of the engine;

directing the second portion of the exhaust gas through the turbine stage of said turbocharger, said exhaust gas aftertreatment device, and subsequently into an ambient environment when said engine is operating in said defined low load portion of the engine operating regime;

directing all of the exhaust gas from said exhaust manifold through the turbine stage of said turbocharger and into said exhaust gas aftertreatment device in response to determining that said engine is operating in one of said defined medium to high load portion of the operating regime of the engine;

discharging the exhaust gas from said exhaust gas aftertreatment device;

subsequently controllably dividing the exhaust gas discharged from the exhaust gas aftertreatment device into principal and subordinate portions;

directing the principal portion of said exhaust gas through an exhaust gas recirculation cooler;

directing the principal portion of said exhaust gas through an exhaust gas recirculation flow control valve;

discharging the principal portion of said exhaust gas into an intake conduit in fluid communication with the intake port of the compressor stage of said turbocharger;

controllably mixing the principal portion of the exhaust gas with air;

directing the mixed principal portion of the exhaust gas and air into the intake port of the compressor stage of said turbocharger;

compressing the mixed principal portion of the exhaust gas and air;

passing at least a portion of said compressed mixture of the principal portion of exhaust gas and air through an intercooler wherein the temperature of said portion is controlled so that when subsequently remixed with any remaining portion of the compressed mixture of the principal portion of exhaust gas and air, the resultant mixture will have a temperature below a temperature at which significant soot is formed when said engine is operating in said defined medium to high load portion of the engine operating regime;

remixing said portion of said compressed mixture of the principal portion of exhaust gas and air passed through said intercooler with any remaining portion of said compressed mixture of the principal portion of exhaust gas and air;

introducing the remixed compressed mixture of the principal portion of the exhaust gas and air into the intake manifold of said engine;

inducting the compressed mixture of the principal portion of the exhaust gas and air into said at least one combustion chamber of the engine; and discharging the subordinate portion of said exhaust gas into the ambient environment.

2. The method for operating a Diesel engine in two exhaust gas recirculation modes, as set forth in claim 1, wherein said sensing at least one contemporaneous engine operating parameter includes sensing at least one parameter selected from the group consisting of engine speed, crank angle, engine load, intake manifold temperature, engine coolant temperature, exhaust gas temperature, exhaust gas aftertreatment device temperature, fuel injection volume, accelerator angle, and cylinder pressure.

3. The method for operating a Diesel engine in two exhaust gas recirculation modes, as set forth in claim 1, wherein said determining a desirable one of said first and second defined exhaust gas recirculation modes in response to a sensed value of said at least one contemporary engine operating parameter includes determining the desirable exhaust gas recirculation mode based on the sensed value of the coolant temperature.

4. The method for operating a Diesel engine in two exhaust gas recirculation modes, as set forth in claim 1, wherein said determining a desirable one of said first and second defined exhaust gas recirculation modes in response to a sensed value of said at least one contemporary engine operating parameter includes determining the desirable exhaust gas recirculation mode based on the sensed value of the intake manifold temperature.

5. The method for operating a Diesel engine in two exhaust gas recirculation modes, as set forth in claim 1, wherein said determining a desirable one of said first and second defined exhaust gas recirculation modes in response to a sensed value of said at least one contemporary engine operating parameter includes determining the desirable exhaust gas recirculation mode based on the sensed value of one of exhaust gas temperature and exhaust gas aftertreatment device temperature.

6. The method for operating a Diesel engine in two exhaust gas recirculation modes, as set forth in claim 1, wherein said determining a desirable one of said first and second defined exhaust gas recirculation modes in response to a sensed value of said at least one contemporary engine operating parameter includes determining the desirable exhaust gas recirculation mode based on the sensed value of the maximum pressure sensed in said at least one combustion chamber during a combustion cycle of the engine.

7. The method for operating a Diesel engine in two exhaust gas recirculation modes, as set forth in claim 1, wherein said determining a desirable one of said first and second defined exhaust gas recirculation modes in response to a sensed value of said at least one contemporary engine operating parameter includes determining the desirable exhaust gas recirculation mode based on the sensed value of the rate of change in pressure within said at least one combustion chamber with respect to a change in crank angle.

8. The method for operating a Diesel engine in two exhaust gas recirculation modes, as set forth in claim 1, wherein said determining a desirable one of said first and second defined exhaust gas recirculation modes in response to a sensed value of said at least one contemporary engine operating parameter includes determining the desirable exhaust gas recirculation mode based on the sensed value of a change in the heat transfer rate within said at least one combustion chamber with respect to crank angle.

9. The method for operating a Diesel engine in two exhaust gas recirculation modes, as set forth in claim 1, wherein said engine includes an air intake system extending between the inlet port of said compressor stage of the turbocharger and said source of ambient air, said air intake system being adapted to control the flow of ambient air from said source to said inlet port of the compressor stage, and said method includes controllably regulating the amount of ambient air provided to the inlet port of said compressor stage.

10. The method for operating a Diesel engine in two exhaust gas recirculation modes, as set forth in claim 1, wherein said air intake system includes an air flow meter and said method includes measuring the flow rate of ambient air provided to said inlet port of the compressor stage.

11. The method for operating a Diesel engine in two exhaust gas recirculation modes, as set forth in claim 1, wherein said engine includes an intercooler interposed between the discharge port of the compressor stage of the turbocharger and the intake manifold of the engine, and said method includes controllably directing at least a portion of the compressed mixture of the principal portion of the exhaust gas and air through the intercooler after discharge from the compressor stage of the turbocharger and prior to discharge into the intake manifold of the engine.

12. A dual loop exhaust gas recirculation system for a diesel engine having at least one combustion chamber, an intake manifold and an exhaust manifold in respective fluid communication with the combustion chamber, and a turbocharger having a turbine stage and a compressor stage, said turbine stage having an inlet port in fluid communication with said exhaust manifold and a discharge port, and said compressor stage having an inlet port in fluid communication with a source of ambient air and a discharge port in fluid communication with said intake manifold, said dual loop exhaust gas recirculation system comprising:

a high pressure exhaust gas recirculation loop having an oxidation catalyst with opposed intake and discharge ports, said intake port of the oxidation catalyst being in controlled fluid communication with said exhaust manifold of the engine, and an exhaust gas recirculation flow control valve interposed between said discharge port of the oxidation catalyst and said intake manifold of the engine;

a low pressure exhaust gas recirculation loop having an exhaust gas aftertreatment device with opposed intake and discharge ports, said intake port of the exhaust gas aftertreatment device being in direct fluid communication with the discharge port of the turbine section of said turbocharger, said discharge port of the exhaust gas aftertreatment device being in fluid communication with an exhaust conduit providing fluid communication with an ambient environment, and exhaust gas recirculation cooler having opposed intake and discharge ports, said intake port of the exhaust gas recirculation cooler being in controlled fluid communication with the discharge port of said exhaust gas aftertreatment device, and an exhaust gas recirculation flow control valve interposed between the discharge port of said exhaust gas recirculation cooler and the inlet port of the compressor stage of said turbocharger; and a control unit adapted to control intake manifold temperature by modulating the operation of said exhaust gas recirculation flow control valves in said high pressure and said low pressure exhaust gas recirculation loops to lower the temperature of a compressed mixture of recirculated exhaust gas and air prior to introduction into said intake manifold to a temperature at which soot formation is minimized during operation of said engine in predefined medium to high load operating regime and to maintain the temperature of recirculated exhaust gas introduced into said intake manifold at a temperature at which stable combustion is enabled during operation of said engine in a predefined low load operating regime.

13. The dual loop exhaust gas recirculation system, as set forth in claim 1, wherein said engine has an ambient air intake system, said ambient air intake system having an airflow meter in fluid communication with said source of ambient air and an airflow throttle valve interposed between said airflow meter and the inlet port of the compressor stage of said turbocharger.

14. The dual loop exhaust gas recirculation system, as set forth in claim 1, wherein said low pressure exhaust gas recirculation loop includes an intercooler interposed between the discharge port of the compressor stage of said turbocharger and said intake manifold of the engine.

15. The dual loop exhaust gas recirculation system, as set forth in claim 14, wherein said intercooler is adapted to selectively bypass at least a portion of fluid discharged from the discharge port of said compressor stage around a heat transfer portion of the intercooler and into the intake manifold of the engine without significantly altering the temperature of the bypassed fluid.

* * * * *